B. E. HICKEN.
SELF HEATING SOLDERING IRON AND TORCH.
APPLICATION FILED FEB. 12, 1916.
1,262,047.  Patented Apr. 9, 1918.
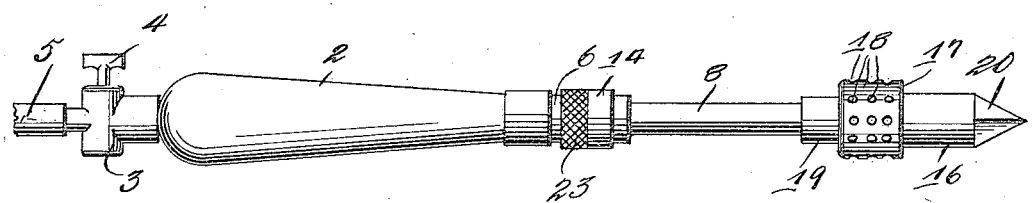
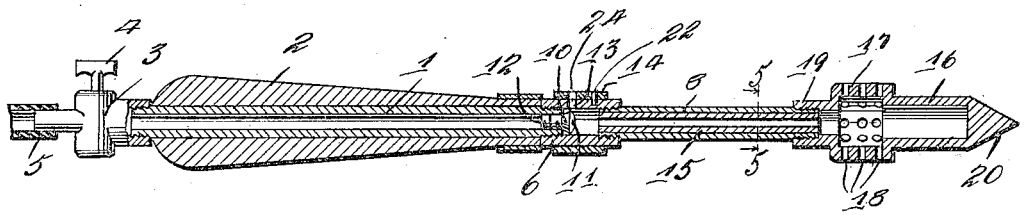
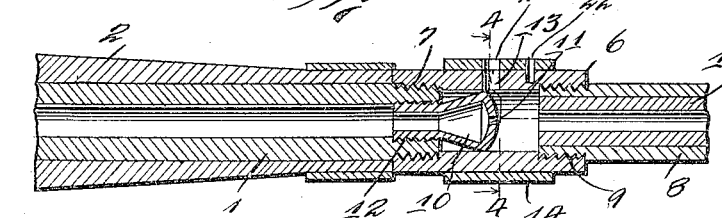
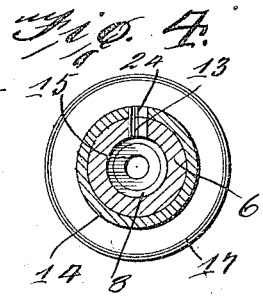
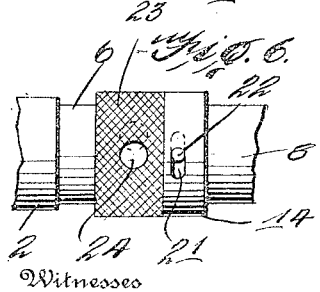
Inventor
B. E. Hicken

UNITED STATES PATENT OFFICE.

BENJAMIN E. HICKEN, OF PRAIRIE HILL, MISSOURI.

SELF-HEATING SOLDERING-IRON AND TORCH.

1,262,047.  Specification of Letters Patent.  Patented Apr. 9, 1918.

Application filed February 12, 1916. Serial No. 77,962.

*To all whom it may concern:*

Be it known that I, BENJAMIN E. HICKEN, a citizen of the United States of America, residing at Prairie Hill, in the county of Chariton and State of Missouri, have invented certain new and useful Improvements in Self-Heating Soldering-Irons and Torches, of which the following is a specification, reference being had therein to the accompanying drawing.

This invention relates to a self-heating soldering iron and torch and has for its principal object the production of a simple and efficient soldering iron which may be supplied with gas and which may also take in air so that the mixture may be transmitted to the flame housing wherein it is ignited for heating the copper.

Another object of this invention is the production of a self-heating soldering iron and torch which is so constructed as to allow the flame of the flame housing to heat the copper, this copper being adapted to be detached when desired so as to allow the flame to positively constitute a torch.

Another object of this invention is the production of a self-heating soldering iron and torch wherein a coupling is employed for connecting the several elements together, this coupling being provided with a simple and efficient means for supplying air to the interior of the device in desired quantities so that the gas may be mixed therewith for providing a mixture for burning in the flame housing.

With these and other objects in view this invention consists of certain novel combinations, constructions, and arrangements of parts as will be hereinafter fully described and claimed.

In the accompanying drawing:

Figure 1 is a side elevation of the self-heating soldering iron and torch, as constructed in accordance with this invention.

Fig. 2 is a central longitudinal section through the self-heating soldering iron and torch.

Fig. 3 is an enlarged longitudinal section through the central portion of the device, illustrating the manner in which the various elements are connected by means of the coupling.

Fig. 4 is a section taken on the line 4—4 of Fig. 3, looking in the direction of the arrows.

Fig. 5 is a section taken on the line 5—5 of Fig. 2, looking in the direction of the arrows.

Fig. 6 is a plan view of a portion of the device, illustrating the manner in which the collar is mounted upon the coupling.

Referring to the accompanying drawing by numerals it will be seen that the self-heating soldering iron and torch comprises the main pipe 1, upon which the grip 2 is carried. This main pipe 1 carries the valve housing 3 having a valve 4 to which the tube 5 is attached, whereby gas may be supplied through the valve housing 3 to the pipe 1. The coupling 6 is elongated and cylindrical in shape and is internally threaded at its ends so as to be connected at one end to the pipe 1 and at its opposite end to the pipe 8, as shown at 9. The gas tip 10, having an opening 11 is positioned within the coupling 6 and has its externally threaded end 12 threaded into the pipe 1, as clearly shown in Fig. 3. Thus, it will be seen that the gas which is passed into the pipe 1 by means of the valve housing 3 will be transmitted through the tip 10 into the coupling 6. The coupling 6 is provided with an opening 13 communicating with the interior thereof, and this opening 13 may be partially closed or entirely opened by means of the collar 14 which is rotatably mounted upon the coupling. This collar 14 is provided with a slot 21 through which the pin 22 carried by the coupling 6 extends for limiting the rotary movement of the collar in either direction. The collar 14 is provided with a milled portion 23 upon its periphery for facilitating the rotation of the collar when desired. It is, of course, understood that it is intended to have this collar mounted upon the coupling snugly enough so as to frictionally engage and bind upon the coupling at all times so that when the collar is turned to a desired adjusted position it will not move accidentally. This collar is further provided with an opening 24 of substantially the same size as the opening 13 formed in the coupling 6, and, therefore, when the collar is rotated so as to allow these openings 13 and 24 to register the greatest supply of air will pass into the interior of the coupling so as to be mixed with the gas passing from the tip 10. It will be noted that by the rotation of the collar the openings may be moved out of registry and thus the supply of air into the interior of the coupling will be diminished. The length of this slot 21 is such, however, as to prevent the openings from moving entirely from registry and, therefore, a small supply of air may be passed into the interior of the coupling at all times. This is very desirable where it is desired to heat the copper to only a minimum degree, which will be accomplished by the reduction of the supply of air and gas, while the provision of the air will prevent the flame within the housing 17 from smoking.

The pipe 8 carries the reduced tube 15 extending throughout its entire length so that this tube will communicate with the interior of the coupling 6 and as the gas and air which are mixed within the coupling 6 pass through the tube 15 they will become very thoroughly mixed so that when passing from the tube 15 the mixture will be in a condition to be readily ignited.

The copper 16 is provided with a flame housing 17 having a plurality of apertures 18 and from this flame housing there extends an integral threaded neck 19 which is removably secured to the end of the pipe 8. As the mixture of gas and air passes from the pipe 15 into the flame housing 17 it may be ignited so as to heat the copper 16. It is, of course, obvious that the burnt gas will pass from the flame housing 17 by means of the apertures 18. It is further obvious that the point 20 of the copper 16 may be of any desired shape which may be necessary for any peculiar or particular work.

When it is desired to use the device as a torch it will be seen that since the neck 19 is removably secured to the pipe 8, the copper and flame housing may be removed so as to allow the mixture to be ignited immediately upon passing from the tube 15, thus constituting a torch.

When the device is in operation the valve 4 may be actuated so as to allow gas to pass through the valve casing 3, into the pipe 1, to the tip 10. Since this tip is provided with an opening 11 the gas will pass into the coupling 6, at which time the collar 14 may be adjusted so as to provide the desired amount of air for the interior of the coupling 6, thus constituting a mixing chamber. As the gas and air pass through the tube 15, they will become more thoroughly mixed and then passing into the flame housing they will be ignited for heating the copper 16.

From the foregoing description it will be seen that a very efficient self-heating soldering iron and torch has been produced, which is so constituted as to allow the copper and flame housing to be detached, whereby the device may be used as a torch, while the several elements are efficiently connected together so as to prevent their accidental displacement, while the coupling will permit the desired amount of air to pass into the interior of the device to mix with the gas when the collar is adjusted.

What is claimed is:

In a device of the class described, the combination with a pipe, of a gas tip comprising a neck, said neck mounted upon said pipe, said gas tip having a discharge aperture formed therein, a coupling mounted upon said pipe and surrounding the gas tip, said coupling provided with an aperture admitting air to the interior of said coupling adjacent to the apertured portion of the gas tip, a collar mounted upon said coupling, said collar provided with an aperture registering with the aperture of said coupling, said collar adapted to be rotated upon said coupling for limiting the amount of air passing through the aperture of said coupling, means on said coupling and engaging the collar for limiting the rotary movement of the collar, a second pipe attached to said coupling, said last-mentioned pipe being provided with a tube therein and with a copper on its outer end, said copper provided with an enlarged flame housing, and a neck extending inwardly from the flame housing of the copper, said neck being threaded upon the last-mentioned pipe, and said flame housing of the copper provided with a plurality of apertures, substantially as shown and described.

In testimony whereof I hereunto affix my signature.

BENJAMIN E. HICKEN.

Copies of this patent may be obtained for five cents each, by addressing the "Commissioner of Patents, Washington, D. C."